United States Patent
Xiao et al.

(10) Patent No.: US 12,475,706 B2
(45) Date of Patent: Nov. 18, 2025

(54) GENERATING SHORT-FORM CONTENT FROM FULL-LENGTH MEDIA USING A MACHINE LEARNING MODEL

(71) Applicant: Roku, Inc., San Jose, CA (US)

(72) Inventors: Fei Xiao, San Jose, CA (US); Nam Vo, San Jose, CA (US); Ronica Jethwa, Mountain View, CA (US); Abhishek Bambha, Burlingame, CA (US); Rohit Mahto, San Jose, CA (US); Amit Verma, Sunnyvale, CA (US); Pulkit Aggarwal, Santa Clara, CA (US); Zidong Wang, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/394,923

(22) Filed: Dec. 22, 2023

(65) Prior Publication Data

US 2025/0209817 A1 Jun. 26, 2025

(51) Int. Cl.
*G06V 20/40* (2022.01)
*G06V 10/70* (2022.01)
(Continued)

(52) U.S. Cl.
CPC .............. *G06V 20/49* (2022.01); *G06V 10/70* (2022.01); *G06V 20/41* (2022.01); *G11B 27/031* (2013.01); *G11B 27/102* (2013.01); *G11B 27/34* (2013.01)

(58) Field of Classification Search
CPC ........ G06V 20/49; G06V 10/70; G06V 20/41; G11B 27/031; G11B 27/102; G11B 27/34
See application file for complete search history.

(56) References Cited

U.S. PATENT DOCUMENTS

2018/0098101 A1* 4/2018 Pont ................. H04N 21/44204
2021/0158845 A1* 5/2021 Sethi ....................... G06V 10/82
(Continued)

OTHER PUBLICATIONS

University of Maryland, "Researchers develop method for video promo clips via facial expression tracking," Sep. 14, 2018, retrieved Mar. 11, 2024, 4 pages, from https://phys.org/news/2018-09-method-video-promofacial-tracking.html.

(Continued)

*Primary Examiner* — Mishawn N. Hunter
(74) *Attorney, Agent, or Firm* — Sterne, Kessler, Goldstein & Fox P.L.L.C.

(57) ABSTRACT

Disclosed herein are system, apparatus, article of manufacture, method and/or computer program product aspects, and/or combinations and sub-combinations thereof, for generating short-form content. An example aspect operates by analyzing a media file in a library using a machine learning model. To analyze the media file, the embodiment determines, using the machine learning model, a first portion of the media file that has a feature that satisfies a classification that the machine learning model is configured to identify. The embodiment tags the first portion using one or more position tags indicative of a beginning of the first portion of the media file or an end of the first portion of the media file. The embodiment then generates a segment from the media file based on the one or more position tags. The segment comprises the portion of the media file and excludes one or more second portions of the media file.

20 Claims, 7 Drawing Sheets

(51) Int. Cl.
    *G11B 27/031*    (2006.01)
    *G11B 27/10*    (2006.01)
    *G11B 27/34*    (2006.01)

(56) References Cited

U.S. PATENT DOCUMENTS

| | | | |
|---|---|---|---|
| 2022/0172586 A1* | 6/2022 | San Pedro | G08B 13/19615 |
| 2024/0039905 A1* | 2/2024 | Talavera | G06F 16/248 |
| 2024/0048818 A1* | 2/2024 | Rapaport | H04N 21/2668 |
| 2025/0008188 A1* | 1/2025 | Maity | H04N 21/4884 |

OTHER PUBLICATIONS

YouTube 8M, "3$^{rd}$ Workshop on YouTube-8M Large-Scale Video Understanding," Oct. 28, 2019, Seoul, Korea (ICCV'19), from https://research.google.com/youtube8m/workshop2019/index.html#invited3.

\* cited by examiner

GENERATING SHORT-FORM CONTENT FROM FULL-LENGTH MEDIA USING A MACHINE LEARNING MODEL

BACKGROUND

Field

This disclosure is generally directed to generating short-form media content for playback on a streaming device, and more particularly to providing a method to quickly and efficiently generate a large number of short-form media files from an existing media library using machine learning models.

SUMMARY

Provided herein are system, apparatus, article of manufacture, method and/or computer program product aspects, and/or combinations and sub-combinations thereof, for seamless and uninterrupted viewing transitions between display content in an operating system (OS) user interface (UI) and display content in a video streaming application UI.

An example aspect operates by a method implemented in connection with a library having a plurality of media files. The method includes analyzing a media file in the library using a machine learning model. The analyzing includes determining, using the machine learning model, a first portion of the media file that has a feature that satisfies a classification that the machine learning model is configured to identify. The analyzing also includes tagging the first portion of the media file using one or more position tags indicative of a beginning of the first portion of the media file or an end of the first portion of the media file. The method also includes generating a segment from the media file based on the one or more position tags. The segment comprises the first portion of the media file and excludes one or more second portions of the media file.

Another example aspect includes a system having one or more memories and at least one processor coupled to at least one of the memories. The at least one processor performs operations that include analyzing a media file in a library of media files using a machine learning model. The analyzing includes determining, using the machine learning model, a first portion of the media file that has a feature that satisfies a classification that the machine learning model is configured to identify. The analyzing also includes tagging the first portion of the media file using one or more position tags indicative of a beginning of the first portion of the media file or an end of the first portion of the media file. The operations also include generating a segment from the media content based on the one or more position tags. The segment comprises the first portion of the media file and excludes one or more second portions of the media file.

Another example aspect includes a non-transitory computer-readable medium having instructions stored thereon that, when executed by at least one computing device, cause the at least one computing device to perform operations that include analyzing a media file in a library of media files using a machine learning model. The analyzing includes determining, using the machine learning model, a first portion of the media file that has a feature that satisfies a classification that the machine learning model is configured to identify. The analyzing also includes tagging the first portion of the media file using one or more position tags indicative of a beginning of the first portion of the media file or an end of the first portion of the media file. The operations also include generating a segment from the media file based on the one or more position tags. The segment comprises the first portion of the media file and excludes one or more second portions of the media file.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product aspects, and/or combinations and sub-combinations thereof, for generating a large number of short-form media files from an existing library of media files. A library of media content may potentially contain thousands or millions of valuable short clips or segments. In order to provide convenient access to this short-form content within the media content in the library, media files in the library may be analyzed for identifiable features according to different classifications. Short-form content may then be generated so as to provide short segments of the media content that contain the identified features.

However, such a library may comprise hundreds of thousands of films, audio recordings, books, and more. Additionally, a single movie file may have two or more hours of video footage. Accordingly, the number of hours of content that may need to be analyzed for features may exceed hundreds of thousands of hours. Furthermore, each media file may need to be analyzed for an arbitrary number of classifiable features (e.g., hundreds or thousands of features to be on the lookout for). This may prompt repeated viewings, listenings, or readings of a given file. It would be practically impossible to relegate such an analysis to a human mind. Furthermore, human analysis of such files may be biased and inaccurate, causing inconsistency when the same file is analyzed by different persons (e.g., not identifying a feature when present, or misidentifying the presence of a feature). Examples of features to identify may include an action sequence, a comedy bit, celebrities, actors, fictional characters, a fantasy quidditch sequence, animals, etc., Hence, generating short-form content from a media library may be prohibitively time-consuming and prone to error.

To solve the above technological problems, aspects herein implement machine learning model(s) to automate the generation of short-form content by analyzing and identifying features in media content that meet one or more classification criteria.

Figure 1:
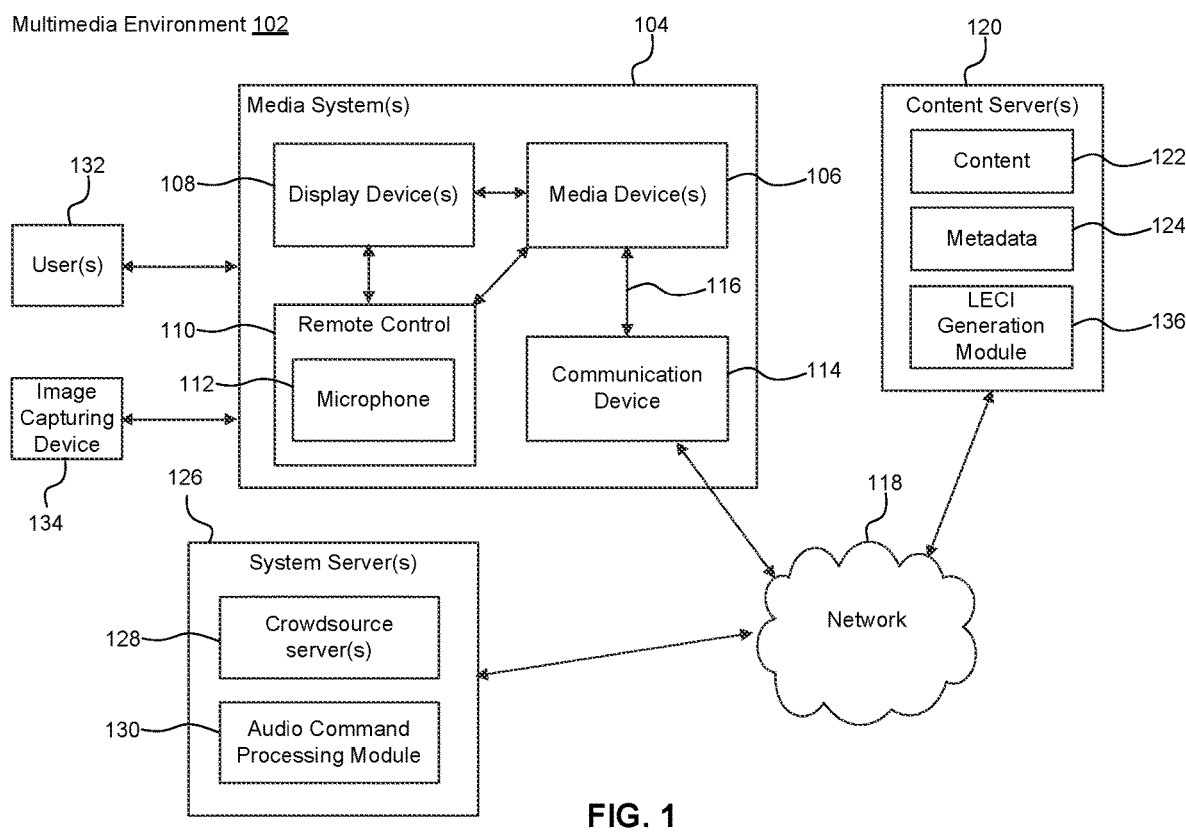
FIG. 1 illustrates a block diagram of a multimedia environment, according to some aspects.

Various aspects of this disclosure may be implemented using and/or may be part of a multimedia environment 102 shown in FIG. 1. It is noted, however, that multimedia environment 102 is provided solely for illustrative purposes, and is not limiting. Aspects of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some aspects. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some aspects, media device 106 may be a part of, integrated with, operatively coupled to, and/or connected to its respective display device 108. A smart TV is an example of a display device with an integrated media device.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In some aspects, the network 118 may include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 may be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some aspects, the remote control 110 wirelessly communicates with the media device 106 and/or display device 108 using cellular, Bluetooth, infrared, millimeter wave, acoustic signals, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some aspects, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing aspects and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some aspects, the media device 106 may be audio responsive, and the audio data may represent verbal commands from the user 132 to control the media device 106 as well as other components in the media system 104, such as the display device 108.

In some aspects, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
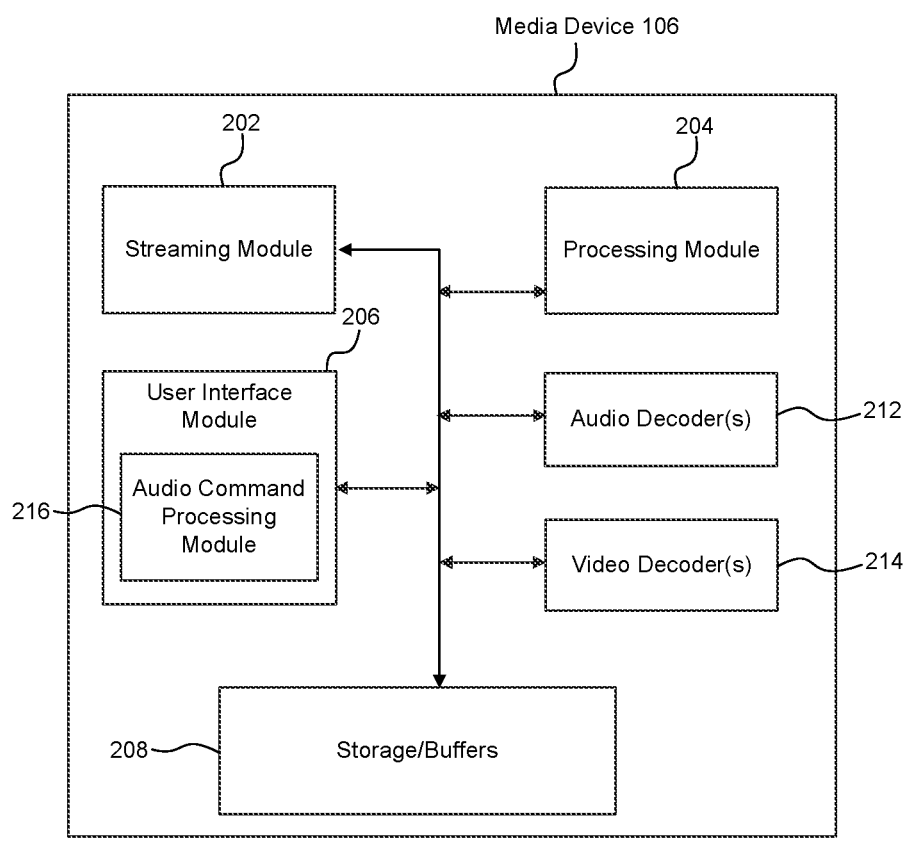
FIG. 2 illustrates a block diagram of a streaming media device, according to some aspects.

In some aspects, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some aspects. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some aspects, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming aspects, the streaming module 202 may transmit the content to the display device 108 in real time or near real time as it receives such content from the content server(s) 120. In non-streaming aspects, the media device 106 may store the content received from content server(s) 120 in storage/buffers 208 for later playback on display device 108.

Generating Short-Form Media Content Using a Machine Learning Model

Referring to FIG. 1, content 122 at content servers 122 may comprise long-form or full-length content (e.g., full length songs, podcasts, videos, movies, TV series episodes/seasons, multimedia, books). Content 122 may be organized as a library of media files. Short segments (e.g., short-form content) of the full-length content is useful for advertising the content, allowing users 132 to preview the full-length content to make a determination on whether to watch, listen, or read a given full-length video, audio, or book. Short-form content also have standalone entertainment value for persons who prefer to consume short-form content over full-length content.

In order to provide convenient access to a library of short-form content, full-length media files of content 122 may be analyzed for identifiable features according to different classifications and short-form content may be generated so as to provide short segments that contain the identified features according to a classification (e.g., a feature may be an action sequence in a movie that meets the criteria of an action sequence classification). The library of content 122 stored at content servers 122 may comprise hundreds of thousands of full-length films, audio, books, and more. Generating short-form content from such a library may be prohibitively cumbersome considering an arbitrary number of classifications (e.g., action sequence, a comedy bit, celebrities, actors, fictional characters, a fantasy quidditch sequence, animals, etc.), especially if the short-form content is generated manually by a person analyzing the full-length content. Furthermore, human analysis of such a library may be biased and inaccurate, causing inconsistency when the same file is analyzed by different persons (e.g., not identifying a feature when present, or misidentifying the presence of a feature). To expedite such analysis, and increase accuracy and consistency when generating short-form content, aspects described herein implement a machine learning model to automate the generation of short-form content by analyzing and identifying features in full-length content that meet one or more classification criteria.

Figure 3:
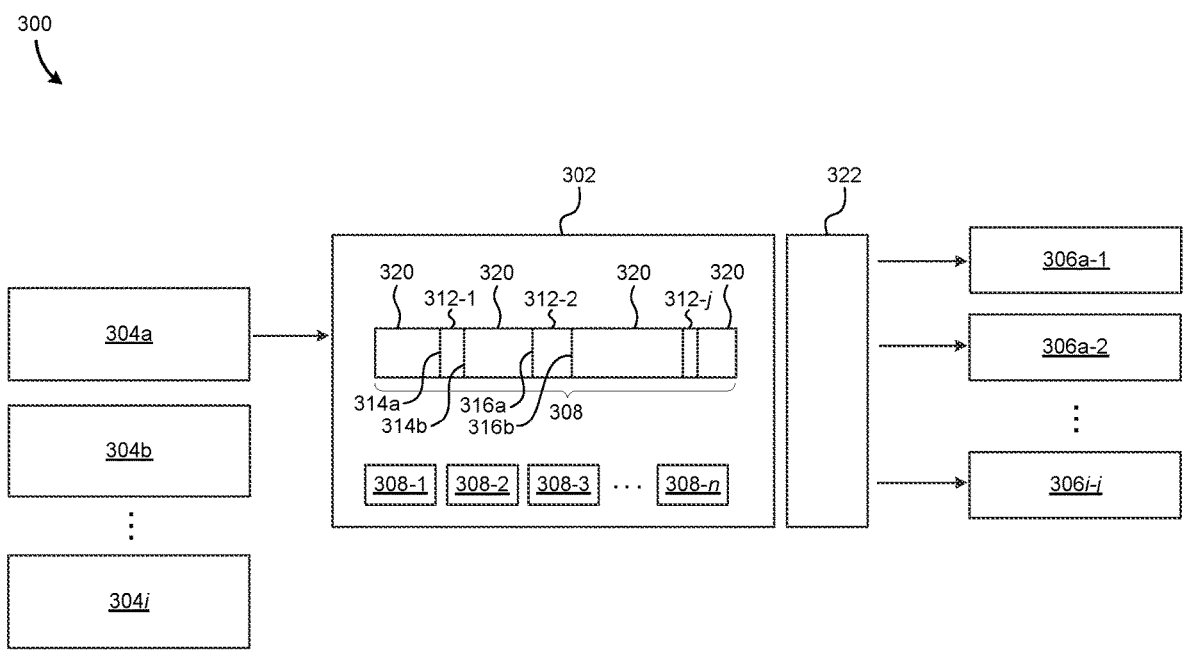
FIG. 3 illustrates a flow diagram of a process for generating short-form media content from a library of media files, according to some aspects.

FIG. 3 illustrates a flow diagram 300 of a process for generating short-form media content from a library of media files, according to some aspects. Flow diagram 300 is described with reference to FIG. 1. In some aspects, a machine learning model 302 is used for generating short-form content by analyzing media files. Media files 304a and 304b from a media library (e.g., content 122) may be used as input for machine learning model 302. There may be an arbitrary number of media files 304i in the media library as would be appreciated by a person of ordinary skill in the art. Media files 304i may comprise full-length media content (e.g., full length movies, TV show episodes, podcasts, books, etc.).

By way of non-limiting example, media file 304a may correspond to the 1993 film "Jurassic Park," having a runtime (total length 308) of approximately two hours. Machine learning model 302 may analyze media file 304a by looking for, and identifying, features that satisfy one or more of classifications 308-1 to 308-n. For example, classification 308-1 may be an action sequence classification (e.g., machine learning model 302 is trained to identify action sequences). Classification 308-2 may be a product placement classification (e.g., machine learning model 302 is trained to identify a product label or shape). Classification 308-3 may be a face recognition classification (e.g., machine learning model is trained to identify a celebrity personality such as Jeff Goldblum). There may be an arbitrary number of classifications 308n as would be appreciated by one of ordinary skill in the art (e.g., hundreds, thousands, or more classifications).

In some aspects, a method uses machine learning model 302 to determine that portion 312-1 (e.g., a first portion) of media file 304 comprises a feature that satisfies classification 308-1 (e.g., a first classification). For example, classification 308-1 may be an action sequence classification and the identified feature in portion 312-1 may comprise the use of firearms (image analysis) accompanied by lack of dialog (audio analysis). To save the time position of portion 312-1 for later reference, position tags 314a and/or 314b may be used. Position tags such as position tags 314a and 314b may exist in memory temporarily (e.g., in volatile memory) or may be persistent (e.g., stored in a metadata file in non-volatile memory). Position tags may be metadata that provide additional information of a media file. Position tag 314a may indicate a beginning of portion 312-1 of media file 304a. Position tag 314b may indicate an end of portion 312-1 of media file 304a. Position tags 314a and 314b may be combined as a single position tag that indicates both the beginning and end of portion 312-1.

In some aspects, enumerative adjectives (e.g., "first," "second," "third," or the like) may be used to distinguishing like elements without establishing an order, hierarchy, quantity, or permanent numeric assignment (unless otherwise noted). For example, a portion may be referred to as a "first portion" without implying or requiring the existence of a "second portion."

In some aspects, once machine learning algorithm 302 identifies the position of portion 312-1 in media file 304a, the information is passed onto algorithm 322 for generating segment 306a-1. To generate segment 306a-1, portions that are not within portion 312-1 are excluded (e.g., deleted, truncated, etc.). For example, one or more portions 320 may be excluded (e.g., one or more second portions) such that segment 306a-1 comprises the content of portion 312-1 and excludes irrelevant portions. An arbitrary number of segments 306i-j may be generated (e.g., short video clips) in this manner based on the number of identified features that satisfy classifications 308n. The index i corresponds to the index used for media files 304i while the index j corresponds to the index used for portions 312j. Hundreds of thousands, millions, or more short-form segments may be generated in an efficient, fast, and automated manner.

In some aspects, using the process described above for portion 312-1 and 306a-1, a portion 312-2 (e.g., a third portion) may be identified as containing a feature that satisfies classification 308-2 (e.g., a second or other classification). classification 308-2 may be a product placement classification and the identified feature in portion 312-2 may comprise an identifiable brand or product (e.g., Barbasol shaving cream can, a Macintosh computer, etc.). Correspondingly, position tags 316a and/or 316b may be used. Segment 306a-2 may be generated based on portion 312-2 and position tags 316a and/or 316b.

Figure 4:
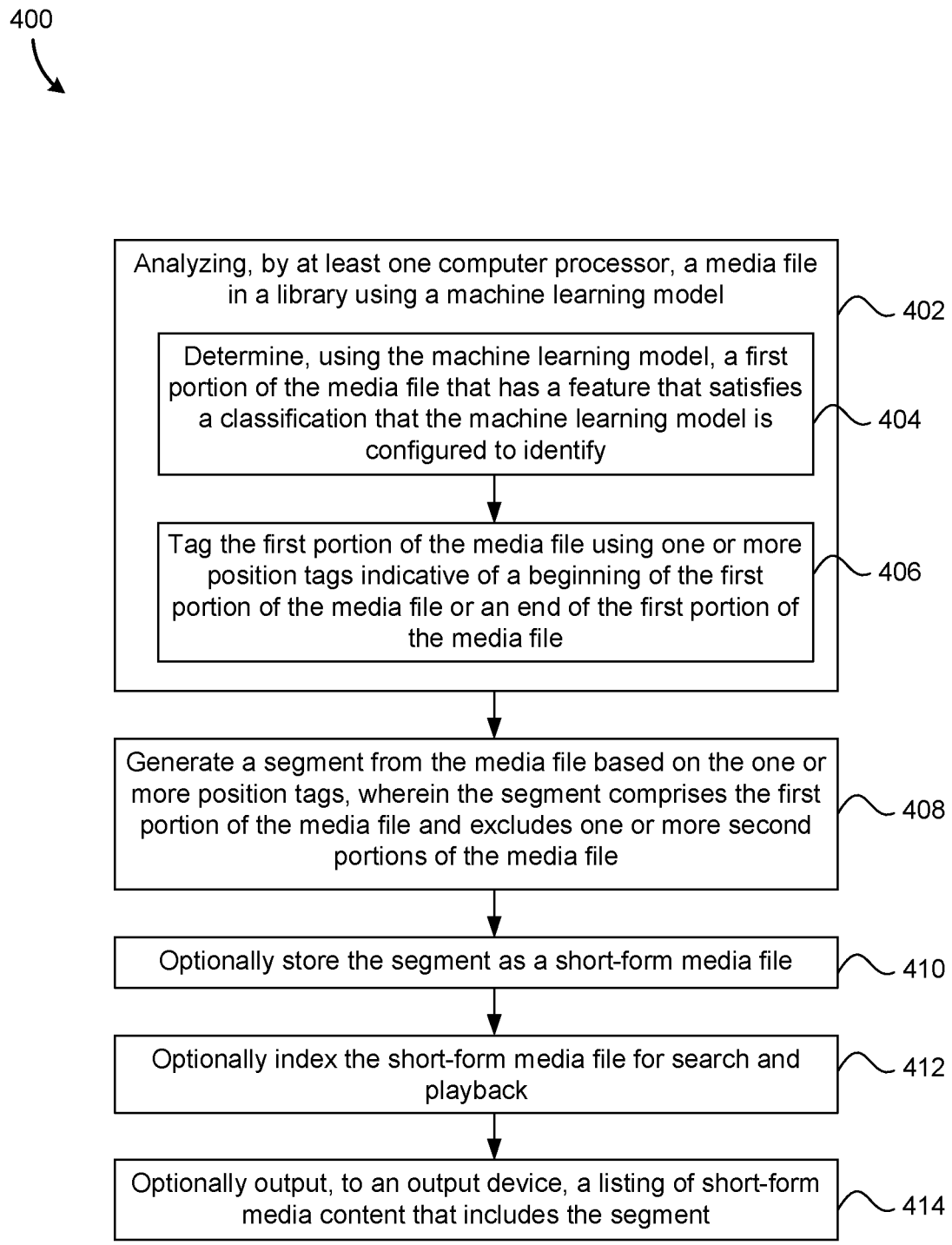
FIG. 4 illustrates a flowchart of a method for generating short-form content from a library of media files, according to some aspects.

FIG. 4 illustrates a flowchart for method 400 for generating short-form content from a library of media files, according to some aspects. Method 400 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 3. However, method 400 is not limited to that example embodiment. Moreover, while the steps of method 400 are described as being performed by a content server 122, the steps of method 400 may also be performed by a computing device coupled to network 118 (e.g., system server 126 or media device 106).

In step 402, content server 122 analyzes media file 304a using machine learning model 302. The media file 304a may correspond to full-length media content (e.g., full length movies, TV show episodes, podcasts, books, etc.). A suitable machine learning model (e.g., a deep learning model) may be implemented to recognize a desired feature for short-form content (e.g., action sequence recognition, face recognition, audio sequence recognition, etc.). Examples of machine learning models for image and audio recognition include, for example, Contrastive Language-Image Pre-training (CLIP), Residual Neural Network (ResNet), BASIC-Lion (BASIC-L), and TensorFlow.

In some aspects, a machine learning algorithm may be used to train a machine learning model. The training may be performed using training data to bias the machine learning model to recognize patterns according to one or more classifications. The machine learning model may intake input data (e.g., a full-length movie) and identify features in the input data according to its training. An identified feature may be a data pattern that satisfies one or more classification criteria that the machine learning model is trained to identify (e.g., trained to identify an action sequence, a face of an actor, types of sounds, etc.). The machine learning model(s) may be trained to identify hundreds, thousands, or more classifications (e.g., video action sequence, audio action sequence, a face of a specific actor/actress, types of sounds, a specific animal, a dance sequence, a product logo or identifier, a text sequence, etc.), thereby reducing the time burden of analyzing a library of media files and streamlining the generating of a large quantity of short-form media content. The above examples refer to content-based models—analyzing whether a particular content feature is present in a media file. In some aspects, a machine learning model may be an interaction-based model (e.g., based on user-interaction), described in more detail with respect to FIG. 6.

In some aspects, the step of analyzing of the one or more media files may be divided into multiple steps, for example, steps 404 and 406.

In step 404, content server 122 determines, using machine learning model 302, a first portion of the media file that has a feature that satisfies a classification that the machine learning model is configured to identify (e.g., portion 312-1 has a feature that satisfies classification 308-1).

In step 406, content server 122 tags the first portion of the media file using a position tag (e.g., position tags 314a and/or 314b). The position tag may indicate a position of the first portion relative to the full runtime or length of the media file (e.g., a beginning of the first portion of the media file and/or an end of the portion of the media file). Consider an example of a video file. The portion may be a short clip taken from the video. The position tags may be temporal tags (positions in time; time stamps). For example, a short clip from a video that is 2 hours long may be assigned position tags of 0:01:35 and 0:03:45—indicating that the identified clip (having the features that satisfy one or more classification criteria) begins at the 1 minute, 35 second mark and ends at the 3 minutes, 45 second mark of the original media content from which the short clip was taken from. Portions of audio files may be tagged in a similar manner. Portions of text may use other positional tags (e.g., character string position, paragraph number, page number, etc.). Beginning and end identifiers may be implemented as a single tag that combines the beginning and end information or as two tags that separately indicate the beginning and end information. That is, one or more position tags may be indicative of a beginning of the portion and/or an end of the portion. Other suitable tagging schemes may be used.

In step 408, content server 122 generates a segment (e.g., short-form content) from the media file. The segment comprises the first portion and excludes one or more second portions of the media file based on the one or more position tags.

In step 410, content server 122 optionally stores the segment as a short-form media file. The short-form media file may be stored on a suitable device (e.g., content servers 120). In step 412, content server 122 optionally indexes the short-form media file. Indexing the short-form media file facilitates search and playback of short-form content.

In step 414, content server 122 optionally outputs one or more listings of short-form content to an output device. The one or more listings may be organized based on the classifications. The listing(s) comprises the segment such that a user is able to select the segment for viewing and/or listening. It is to be appreciated that display content is not limited to visual content viewable on display device 108. In some aspects, display device 108 may be generalized to any suitable output device based on the type of content (e.g., speaker/audio player for audio content). Therefore, descriptions referring to video content and display device 108 (FIG. 1) may be extended to media content and output devices in general.

In some aspects, the short-form media file, which represents the segment, may have associated information that links back to the longer media content from which the segment originated. Such a feature may be implemented via metadata 124 (FIG. 1). In this manner, a user is able to quickly and conveniently navigate to the source of the segment—the full length content of the source media file (e.g., full-length film).

Figure 5:
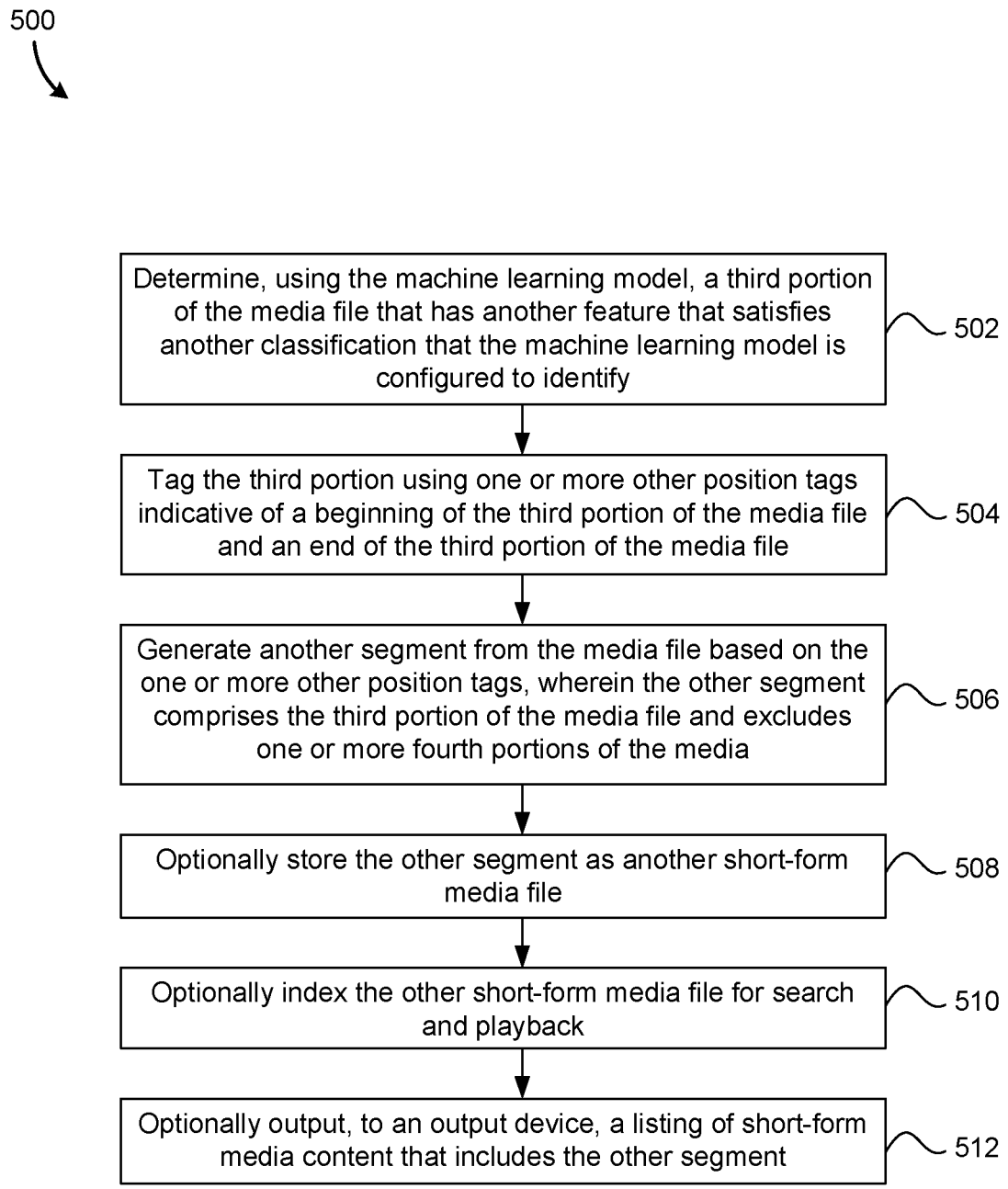
FIG. 5 illustrates a flowchart of a method for generating short-form content from a library of media files, according to some aspects.

FIG. 5 illustrates a flowchart for method 500 for generating multiple short-form content from a library of media files, according to some aspects. Method 500 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 500 shall be described with reference to FIGS. 1 and 3. However, method 500 is not limited to that example embodiment. In some aspects, method 500 may be an extension of method 500 (FIG. 3). Moreover, while the steps of method 500 are described as being performed by a content server 122, the steps of method 500 may also be performed by a computing device coupled to network 118 (e.g., system server 126 or media device 106).

In step 502, content server 122 determines, using machine learning model 302, a third portion of the media file that has another feature that satisfies the other classification (e.g., portion 312-2 has a feature that satisfies classification 308-2). The determined third portion of the media content may represent, for example, a segment(s) of a video, a segment(s) of an audio recording, a section(s) of text from a book, etc.

In step 504, content server 122 tags the third portion of the media file using one or more other position tags indicative of a beginning of the third portion of the media file and an end of the third portion. The position tags may be suitable progression identifier (e.g., temporal tags, paragraph number, etc.). Steps 402 and/or 404 may be implemented as part of step 402 (FIG. 4).

In at step 506, content server 122 generates another segment from the media content based on the one or more other position tags. The other segment comprises the third portion of the media file and excludes one or more fourth portions of the media file.

In step 508, content server 122 optionally stores the other segment as another short-form media file.

In step 510, content server 122 optionally indexes the other short-form media. Indexing the short-form media file facilitates search and playback of short-form content.

In step 512, content server 122 optionally outputs, to an output device, a listing of short-form media content. The listing comprises the other segment. A user is able to select the other segment from the listing for viewing and/or listening. The other short-form media file, which represents the other segment, may have associated information that links back to the longer media content from which the segment originated.

In some aspects, one or more of the steps of methods 400 and 500 may be repeated on media files 304i in the library.

Figure 6:
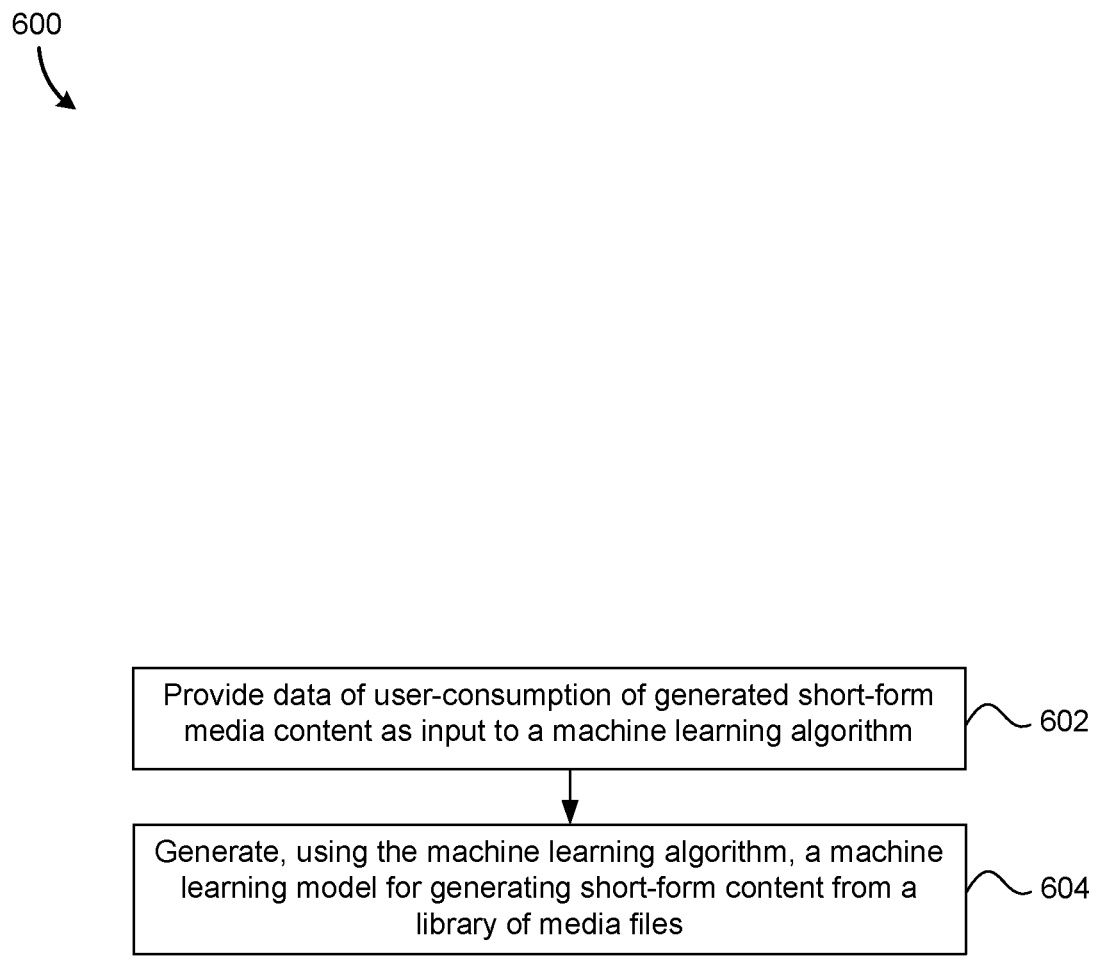
FIG. 6 illustrates a flowchart of a method for generating a machine learning model based on user data, according to some aspects.

FIG. 6 illustrates a flowchart for method 600 for generating a machine learning model based on user data, according to some aspects. Method 600 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 1 and 3. However, method 600 is not limited to that example embodiment. While the steps of method 600 are described as being performed by a content server 122, the steps of method 600 may also be performed by a computing device coupled to network 118 (e.g., system server 126 or media device 106).

In step 602, content server 122 provides data of user-consumption of media content for input to a machine learning algorithm. The data may represent, for example, users' engagement of short-form media content output to a user via an output device (e.g., as in steps 414 and 512 of FIGS. 4 and 5). User-engagement may comprise one or more metrics, for example, number of views of a given short-form video, audio, or text.

In step 604, content server 122 generates, using the machine learning algorithm, a machine learning model. The machine learning model may be configured to generate short-form content from a library of media files.

In some aspects, the machine learning model may be an interaction-based model (e.g., based on user-interaction). The machine learning model may be trained to identify one or more features in a media file that satisfies one or more classifications having high user-engagement metrics (e.g., via data provided to the machine learning algorithm at step 602).

In some aspects, the machine learning model may be used to generate a random segment from a media file. The random segment may be used for exploratory purposes (e.g., for determining previously undiscovered classifications with unexpectedly high user-engagement). A random segment may be generated by having a machine learning algorithm set random position tags. The method of randomly generating a segment may be completely decoupled from classifications or may be implemented along with methods 400 and 500 (e.g., randomizing one or more of the position tags) such that the randomly generated segment includes one or more features that satisfies one or more classifications.

In some aspects, the process of repeatedly applying methods 400 and/or 500 to files of a media library may be in no particular order (e.g., one file to the next, one classification to the next, etc.). In some aspects, the process of repeatedly applying methods 400 and/or 500 to files of a media library may be targeted for increased efficiency and valuable results. For example, based on user-engagement data, the machine learning model may be trained with a popularity prediction function. That is, the machine learning model may identify media files that are more likely to generate short-form media content that has an increased likelihood of high user-engagement. For example, using a popularity-predictor machine learning model, files of two television series may be analyzed (e.g., "2 Broke Girls" and "Cold Case"). After analyzing a file from "2 Broke Girls," the popularity-predictor learning model may indicate that the file has a 10% probability of generating a segment that exceeds a prescribed user-engagement threshold, whereas an analysis a file from "Cold Case" may indicate a 0.1% probability of generating a segment that exceeds the prescribed user-engagement threshold.

Example Computer System

Figure 7:
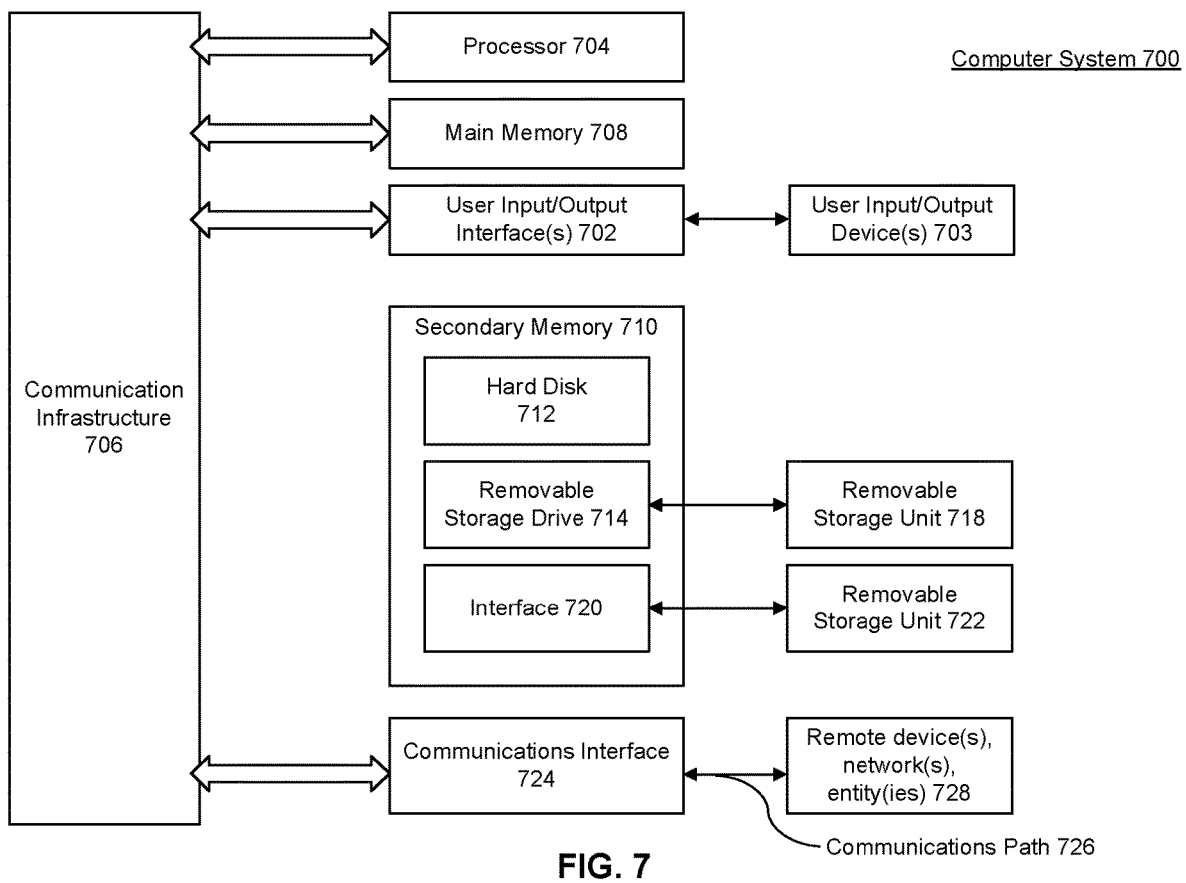
FIG. 7 illustrates an example computer system useful for implementing various aspects.

Various aspects may be implemented, for example, using one or more well-known computer systems, such as computer system 700 shown in FIG. 7. For example, a device in multimedia environment 102 (e.g., content server 122) may be implemented using combinations or sub-combinations of computer system 700. Also or alternatively, one or more computer systems 700 may be used, for example, to implement any of the aspects discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In some aspects, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 7. In particular, aspects may operate with software, hardware, and/or operating system implementations other than those described herein.

Conclusion

It is to be appreciated that the Detailed Description section, and not any other section, is intended to be used to interpret the claims. Other sections may set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative aspects may perform functional blocks, steps, operations, methods, etc. using orderings different than those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects may be described using the expression "coupled" and "connected" along with their derivatives. These terms are not necessarily intended as synonyms for each other. For example, some aspects may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer-implemented method to generate short-form content from a library of media files, the computer-implemented method comprising:

identifying, by at least one computer processor, a media file in the library using a machine learning model trained with a popularity prediction function and using data of user consumption of media content, the data including metrics representative of user engagement with short-form media content output to a user via an output device, the metrics including a number of user engagements of a short-form video, audio, or text, wherein the popularity prediction function indicates that a segment generated from the media file has a greater likelihood of user engagement as compared to a segment generated from another media file in the library;

analyzing the media file using the machine learning model, wherein the analyzing comprises:

determining, using the machine learning model, a first portion of the media file that has a feature that satisfies a classification that the machine learning model is configured to identify, and wherein the classification is based on the metrics representative of user engagement with short-form media content; and tagging the first portion of the media file using one or more position tags indicative of a beginning of the first portion of the media file or an end of the first portion of the media file; and generating a segment from the media file based on the one or more position tags, wherein the segment comprises the first portion of the media file and excludes one or more second portions of the media file.

2. The computer-implemented method of claim 1, further comprising:

storing the segment as a short-form media file.

3. The computer-implemented method of claim 1, wherein:

the analyzing further comprises:

determining, using the machine learning model, a third portion of the media file that has another feature that satisfies another classification that the machine learning model is configured to identify; and tagging the third portion using one or more other position tags indicative of a beginning of the third portion of the media file or an end of the third portion of the media file; and the computer-implemented method further comprises generating another segment from the media file based on the one or more other position tags, wherein the other segment comprises the third portion of the media file and excludes one or more fourth portions of the media file.

4. The computer-implemented method of claim 3, further comprising:
storing the segment and the other segment as short-form media files; and
indexing the short-form media files for search and playback.

5. The computer-implemented method of claim 1, further comprising:
outputting, to an output device, a listing of short-form content based on the classification, wherein the listing of short-form content comprises the segment.

6. The computer-implemented method of claim 1, wherein the classification is an action sequence classification.

7. The computer-implemented method of claim 1, wherein the classification is a product identifier classification.

8. A system for generating short-form content from a library of media files, the system comprising:
one or more memories; and
at least one processor each coupled to at least one of the memories and configured to perform operations comprising:
identifying a media file in the library using a machine learning model trained with a popularity prediction function and using data of user consumption of media content, the data including metrics representative of user engagement with short-form media content output to a user via an output device, the metrics including a number of user engagements of a short-form video, audio, or text, wherein the popularity prediction function indicates that a segment generated from the media file has a greater likelihood of user engagement as compared to a segment generated from another media file in the library;
analyzing the media file using the machine learning model, wherein the analyzing comprises:
determining, using the machine learning model, a first portion of the media file that has a feature that satisfies a classification that the machine learning model is configured to identify, and wherein the classification is based on the metrics representative of user engagement with short-form media content; and
tagging the first portion of the media file using one or more position tags indicative of a beginning of the first portion of the media file or an end of the first portion of the media file; and
generating a segment from the media file based on the one or more position tags, wherein the segment comprises the first portion of the media file and excludes one or more second portions of the media file.

9. The system of claim 8, wherein the operations further comprise:
storing the segment as a short-form media file.

10. The system of claim 8, wherein:
the analyzing further comprises:
determining, using the machine learning model, a third portion of the media file that has another feature that satisfies another classification that the machine learning model is configured to identify; and
tagging the third portion using one or more other position tags indicative of a beginning of the third portion of the media file or an end of the third portion of the media file; and
the operations further comprise generating another segment from the media file based on the one or more other position tags, wherein the other segment comprises the other portion of the media file and excludes one or more fourth portions of the media file.

11. The system of claim 10, wherein the operations further comprise:
storing the segment and the other segment as short-form media files; and
indexing the short-form media files for search and playback.

12. The system of claim 8, wherein the operations further comprise:
outputting, to an output device, a listing of short-form content based on the classification, wherein the listing of short-form content comprises the segment.

13. The system of claim 8, wherein the classification is an action sequence classification.

14. The system of claim 8, wherein the classification is a product identifier classification.

15. A non-transitory computer-readable medium having instructions stored thereon that, when executed by at least one computing device, cause the at least one computing device to perform operations comprising:
identifying a media file in a library of media files using a machine learning model trained with a popularity prediction function and using data of user consumption of media content, the data including metrics representative of user engagement with short-form media content output to a user via an output device, the metrics including a number of user engagements of a short-form video, audio, or text, wherein the popularity prediction function indicates that a segment generated from the media file has a greater likelihood of user engagement as compared to a segment generated from another media file in the library;
analyzing the media file using the machine learning model, wherein the analyzing comprises:
determining, using the machine learning model, a first portion of the media file that has a feature that satisfies a classification that the machine learning model is configured to identify, and wherein the classification is based on the metrics representative of user engagement with short-form media content; and
tagging the first portion of the media file using one or more position tags indicative of a beginning of the first portion of the media file or an end of the first portion of the media file; and
generating a segment from the media file based on the one or more position tags, wherein the segment comprises the first portion of the media file and excludes one or more second portions of the media file.

16. The non-transitory computer-readable medium of claim 15, wherein the operations further comprise:
storing the segment as a short-form media file.

17. The non-transitory computer-readable medium of claim 15, wherein:
the analyzing further comprises:
determining, using the machine learning model, a third portion of the media file that has another feature that satisfies another classification that the machine learning model is configured to identify; and tagging the third portion using one or more other position tags indicative of a beginning of the third portion of the media file or an end of the third portion of the media file; and the operations further comprise generating another segment from the media file based on the one or more other position tags, wherein the other segment comprises the other portion of the media file and excludes one or more portions of the media file.

18. The non-transitory computer-readable medium of claim 17, wherein the operations further comprise:

storing the segment and the other segment as short-form media files; and indexing the short-form media files for search and playback.

19. The non-transitory computer-readable medium of claim 15, wherein the operations further comprise:

outputting, to an output device, a listing of short-form content based on the classification, wherein the listing of short-form content comprises the segment.

20. The non-transitory computer-readable medium of claim 15, wherein the classification is an action sequence classification.

* * * * *